(12) United States Patent
Min

(10) Patent No.: US 8,807,091 B2
(45) Date of Patent: Aug. 19, 2014

(54) DOG HARNESS

(75) Inventor: Woosik Min, Little Ferry, NJ (US)

(73) Assignee: Marion International Corp., Little Ferry, NJ (US)

( * ) Notice: Subject to any disclaimer, the term of this patent is extended or adjusted under 35 U.S.C. 154(b) by 459 days.

(21) Appl. No.: 12/776,574

(22) Filed: May 10, 2010

(65) Prior Publication Data

US 2011/0271913 A1 Nov. 10, 2011

(51) Int. Cl.
*A01K 27/00* (2006.01)

(52) U.S. Cl.
USPC .......................................................... 119/856

(58) Field of Classification Search
USPC ......... 119/769, 771, 772, 856, 863–865, 770, 119/907
See application file for complete search history.

(56) References Cited

U.S. PATENT DOCUMENTS

| | | | | |
|---|---|---|---|---|
| 5,644,902 A * | 7/1997 | Kemp | ............................ | 54/37.1 |
| 5,915,335 A * | 6/1999 | Holt, Jr. | ........................ | 119/771 |
| 6,101,979 A * | 8/2000 | Wilson et al. | ................. | 119/725 |
| 6,314,915 B1 * | 11/2001 | Pope et al. | ..................... | 119/712 |
| 6,662,755 B2 * | 12/2003 | Kato | .............................. | 119/856 |
| 8,166,924 B2 * | 5/2012 | Cho | .............................. | 119/792 |
| 2002/0053324 A1 * | 5/2002 | Kato | .............................. | 119/856 |

\* cited by examiner

*Primary Examiner* — Rob Swiatek
*Assistant Examiner* — Ebony Evans
(74) *Attorney, Agent, or Firm* — Leason Ellis LLP

(57) ABSTRACT

A dog harness includes a harness body that has a first end for placement proximate the shoulders of the dog and an opposing second end for placement proximate the hindquarters of the dog. The first end has a pair of first flaps and the second end having a pair of second flaps. The harness includes a first looped strap securely attached to one of the second flaps, with the first strap including a first part of a side release buckle. A second strap is securely attached to the other of the second flaps, with the second strap including a second part of the side release buckle that interlockingly engages the first part. The harness includes a front strap in the form of a loop that is securely attached at a first end to one of the first flaps and has a loop portion that is coupled to a first coupling member that is securely attached to the other of the first flaps. A free second end of the front strap is coupled to a second coupling member through which a portion of the front strap proximate the first end passes. A length of the front strap defined between the first and second coupling members is adjustable, thereby permitting both a tightening and loosening of the first end of the harness body.

10 Claims, 4 Drawing Sheets

DOG HARNESS

TECHNICAL FIELD

The present invention relates to a pet restraint device and in particular, the present invention relates to a leash-controllable dog harness.

BACKGROUND

Most dogs require a certain amount of time outdoors and enjoy the time outdoors in the environment and in the elements. This requires the owner of the dog to spend a certain length of time in walking the dog daily. Before walking the dog, a collar must be mounted on the dog's neck so that a leash can be fastened to the dog for controlling the walking of the dog. The leash is used to lead the dog or to hold it in check. Various collars have been disclosed for this purpose. For example, collars can be equipped with a quick-release hook and a length adjustment frame, while other collars can be equipped with a buckle comprised of a frame and a prong or the collar can be from an elastic band. However, simply using a leash and a collar cannot positively control the movement of the dog in all directions. Further, when pulling the leash, the collar is forced to squeeze the dog's throat and this can result in pain being experienced by the dog.

There are a number of dog harnesses that are commercially available. However, there are sizing and fit issues with these products since these products are often only made available in small, medium and large sizes. However, the dog's body may not be easily categorized as falling within one of these sizes. As a result, the harness does not properly fit. Conventional harnesses have only limited amount of adjustment.

SUMMARY

In accordance with the present embodiment, a dog harness includes a harness body that has a first end and an opposing second end. The first end has a pair of first flaps. The harness includes a first looped strap securely attached to one of the first flaps and a second looped strap securely attached to the other of the first flaps. A rear strap is coupled to the second end of the harness body in such a manner that the rear strap is slidable in a lateral direction. The rear strap having a first end and an opposing second end. The harness includes a first coupling member having an opening formed therein, wherein the first looped strap and the first end of the rear strap are attached to first coupling member by being passed through the opening. The harness of a second coupling member having an opening formed therein, wherein the second looped strap and the second end of the rear strap are attached to the second coupling member by being passed through the opening. The harness includes a third looped strap securely attached to the first coupling member by being passed through the opening thereof. The third strap includes a first part of a side release buckle. A fourth looped strap is securely attached to the second coupling member by being passed through the opening thereof. The fourth strap includes a second part of the side release buckle that interlockingly engages the first part.

In another embodiment, a dog harness includes a harness body that has a first end for placement proximate the shoulders of the dog and an opposing second end for placement proximate the hindquarters of the dog. The first end has a pair of first flaps and the second end having a pair of second flaps. The harness includes a first looped strap securely attached to one of the second flaps, with the first strap including a first part of a side release buckle. A second strap is securely attached to the other of the second flaps, with the second strap including a second part of the side release buckle that interlockingly engages the first part. The harness includes a front strap in the form of a loop that is securely attached at a first end to one of the first flaps and has a loop portion that is coupled to a first coupling member that is securely attached to the other of the first flaps. A free second end of the front strap is coupled to a second coupling member through which a portion of the front strap proximate the first end passes, wherein a length of the front strap defined between the first and second coupling members is adjustable, thereby permitting both a tightening and loosening of the first end of the harness body. The harness includes a looped strap that includes a first opening through which the looped front strap extends and a second opening in which a ring is captured for attachment to a leash.

These and other aspects, features and advantages shall be apparent from the accompanying Drawings and description of certain embodiments of the invention.

DETAILED DESCRIPTION OF CERTAIN EMBODIMENTS OF THE INVENTION

Figure 1:
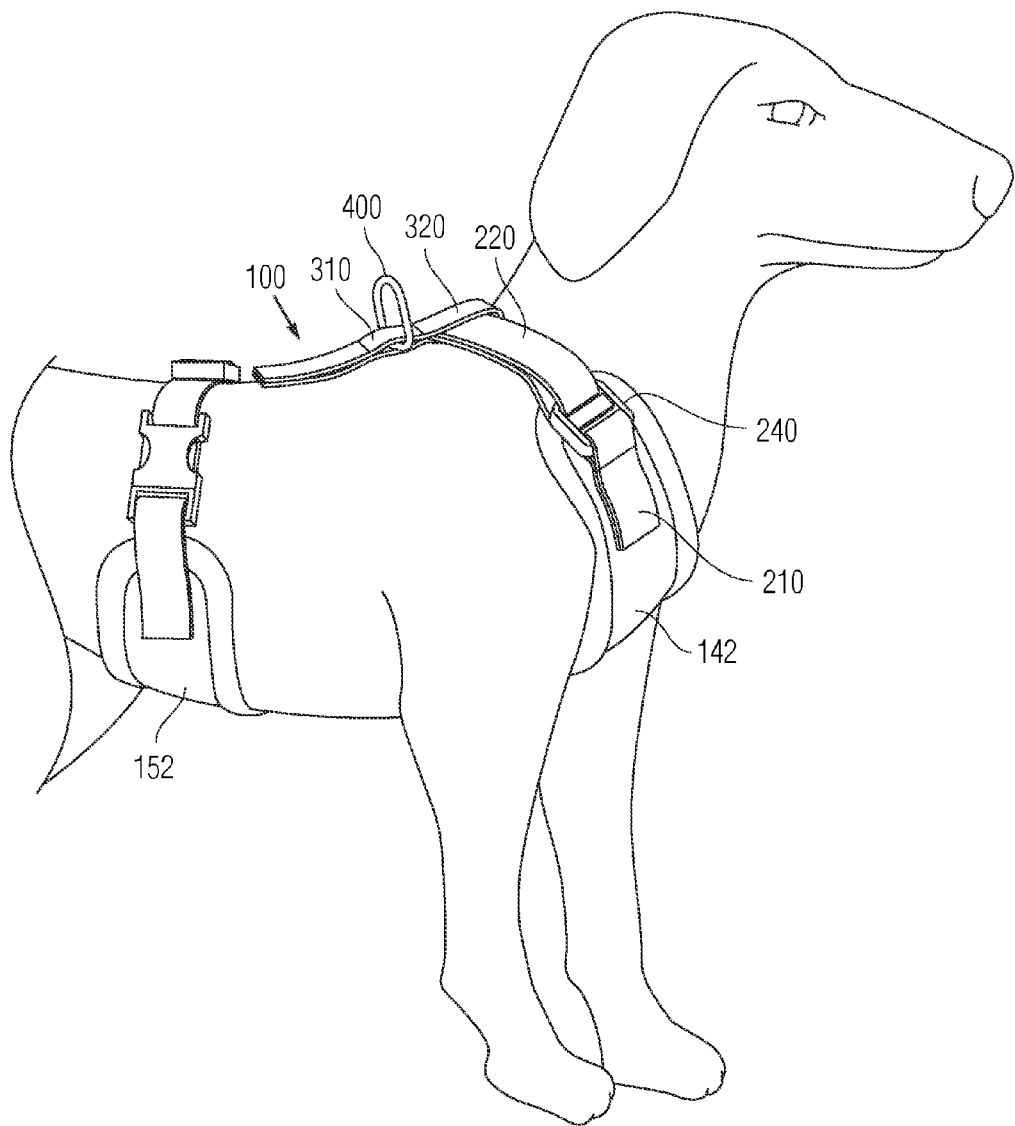
FIG. 1 is a perspective view of a dog harness according to one embodiment fitted to a dog.
Figure 2:
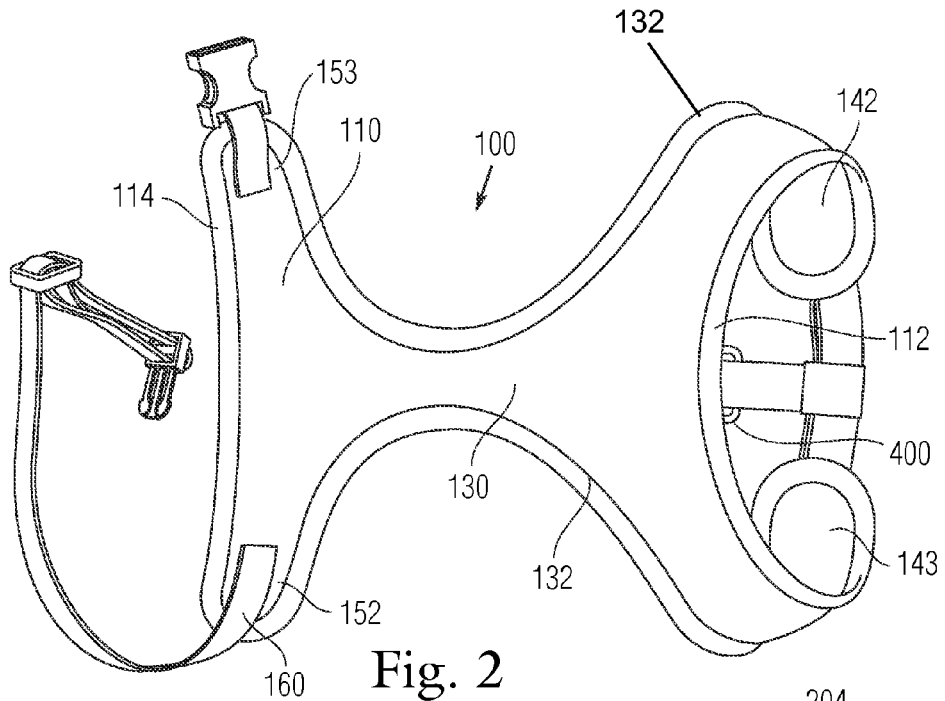
FIG. 2 is bottom perspective view of the dog harness of FIG. 2.
Figure 3:
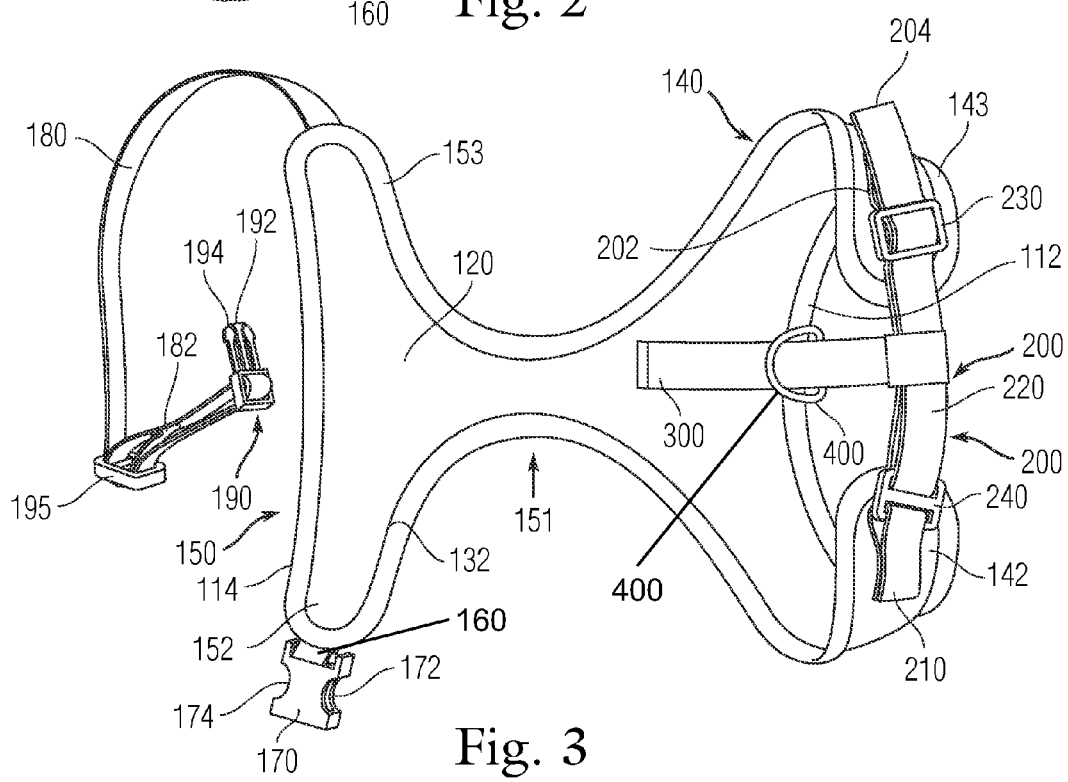
FIG. 3 is a top perspective view of the dog harness of FIG. 3.

FIGS. 1-3 illustrate a dog harness 100 in accordance with a first embodiment of the present invention. The dog harness 100 is of the type that is known as a leash-controllable harness in accordance with the present invention. The harness 100 has a main harness body 110 that has a first end 112 for placement near the neck of the dog and an opposite second end 114 for placement near the rear legs of the dog. The main harness body 110 has a first face or surface 120 that seats against the dog underbelly when worn and an opposite second face or surface 130 that faces away from the dog and faces the ground during use. Since the first face 120 contacts the dog during use, it is formed out of a material that provides comfort. In particular, the first face 120 can be padded or is made from soft material. For example, the harness body 110 can be formed of a synthetic fabric, such as polyester. Along the perimeter edges of the body 110 a folded fabric seam 132 can be formed and has a different texture and feel than the center portion of the body 110. The entire harness body 110 is formed of a fabric material and therefore it is freely foldable and positionable about the dog.

As shown in the figures, the main body 110 generally has an hour glass or I shape that is defines by a first portion 140 that includes the first end 112 and a second portion 150 that includes the second end 114 and a third portion 151 that is located between the first and second portions 140, 150 and represents the middle portion. The first and second portions 140, 150 thus taper down into the third portion 151.

The first portion 140 is defined by a pair of opposing first flaps or wings 142, 143 and similarly, the second portion 150 includes a pair of opposing second flaps or wings 152, 153. It will be appreciated that the length of the first flaps 142 are greater than a length of the second flaps 152 since the first flaps 142 wrap around the shoulder portion of the dog which is typically larger in size than the loin or hindquarters of the dog where the second flaps 152 wrap. The third portion 150 is thus seated against the underside belly or chest of the dog.

A first small loop (strap) 160 is attached to the second flap 152 of the second portion 150 and is configured such that both ends of the strap are attached to the second face 130 of the second flap 152 so as to create a loop. The loop captures a female socket 170 that is part of a plastic side release buckle. The female socket 170 is movable within the open portion of the loop.

On the opposite second flap 153, a strap 180 is provided and includes loop 182 at its end. The loop 182 captures and retains a male plug 190, with the male plug 190 being movable within the open portion of the loop. The male plug 190 is provided with a center tine 192 and a pair of flexible tines 194 on either side of the center tine 192. Female socket 170 is which received the male plug 190 is provided with side notches 172, 174 which expose catch projections on the tines 194 when the male plug is inserted into the female socket 170. To release the buckle, one has only to squeeze in flexible tines 194 so that the male plug 190 can then be withdrawn from the female socket 170. A slide 195 is provided along the strap 180 and loop 182. To effect a torso size fit, the length of the folded over loop portion 182 between the male plug 190 and the slider 195 is adjusted by shifting the position of the slider 195 within the loop 182.

Similarly, the first portion 140 also includes a structure that permits adjustment at the shoulder portion of the dog. In particular, a strap 200 has a first end 202 that is fixedly attached to the end of the first flap 143 and an opposite second end 204 that is a free end. The strap 200 is folded over itself to create a loop 220. A slider 230 is provided along the strap 200 proximate the end 202 that is attached to the first flap 143, with the strap 200 being routed through the slider 230.

A first small loop (strap) 210 is attached to the first flap 142 of the first portion 140 and is configured such that both ends of the strap are attached to the second face 130 of the first flap 142 so as to create a loop. The loop captures a slider 240. The strap 200 is fed through the slider 240 to create the loop 220 by allowing the strap 200 to be folded over itself. The free end 204 of the strap 200 is then fed across through a slot in the slider 230.

A leash strap 300 is provided and includes at least two different loop sections. The strap 200 is fed through one of the loops which is formed at the end of the folded leash strap 300. Within the other loop section, a metal coupling ring 400 is provided for attaching a leash to the dog harness 100.

To effect a chest size adjustment, the length of the loop 220 is adjusted by pulling on the free end 204 of the strap which causes the first flaps 142, 143 to be drawn in toward one another, thereby tightening the harness in the shoulder area. Conversely, the opposite motion causes the first flaps 142, 143 to be drawn apart, thereby loosening the harness in the shoulder area.

In use, the dog harness 100 is positioned underneath the dog with the first face 120 facing the dog's underside. To effect a torso size fit, the length of the folded over loop portion 182 between the male plug 190 and the slider 195 is adjusted by shifting the position of the slider 195 within the loop 182. The two second flaps 152, 153 are thus placed into contact with the hindquarters of the dog and the strap 180 is draped over the back of the dog and the male plug 190 is inserted into the female socket 170 to thereby secure the second portion 150 to the dog.

To securely attach the first portion 140 to the dog's shoulder area, the length of the loop 220 is adjusted by pulling on the free end 204 of the strap which causes the first flaps 142, 143 to be drawn tightly into the dog's body. A coupling member at the end of the leash is attached to the ring 400.

Figure 4:
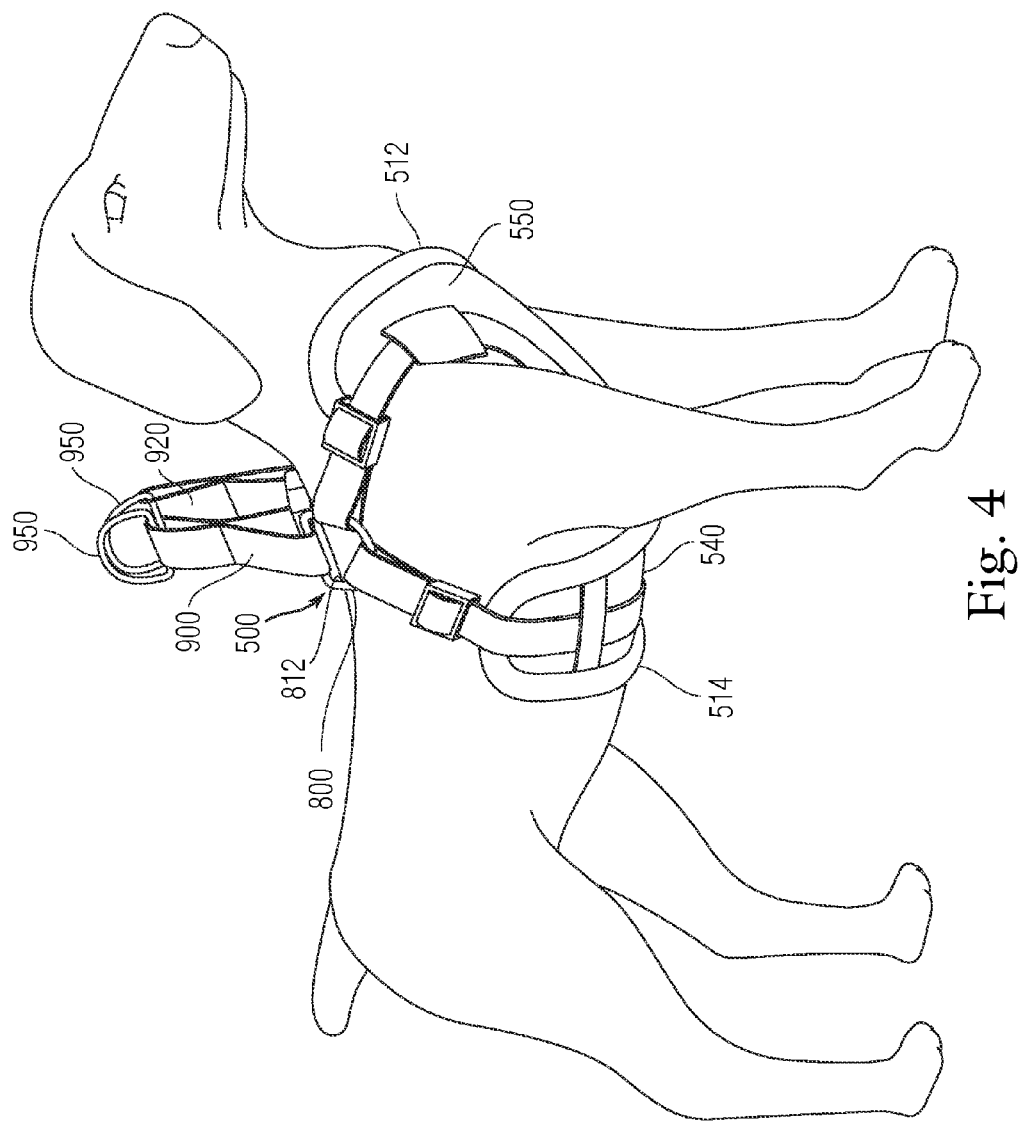
FIG. 4 is a perspective view of a dog harness according to one embodiment fitted to a dog.
Figure 5:
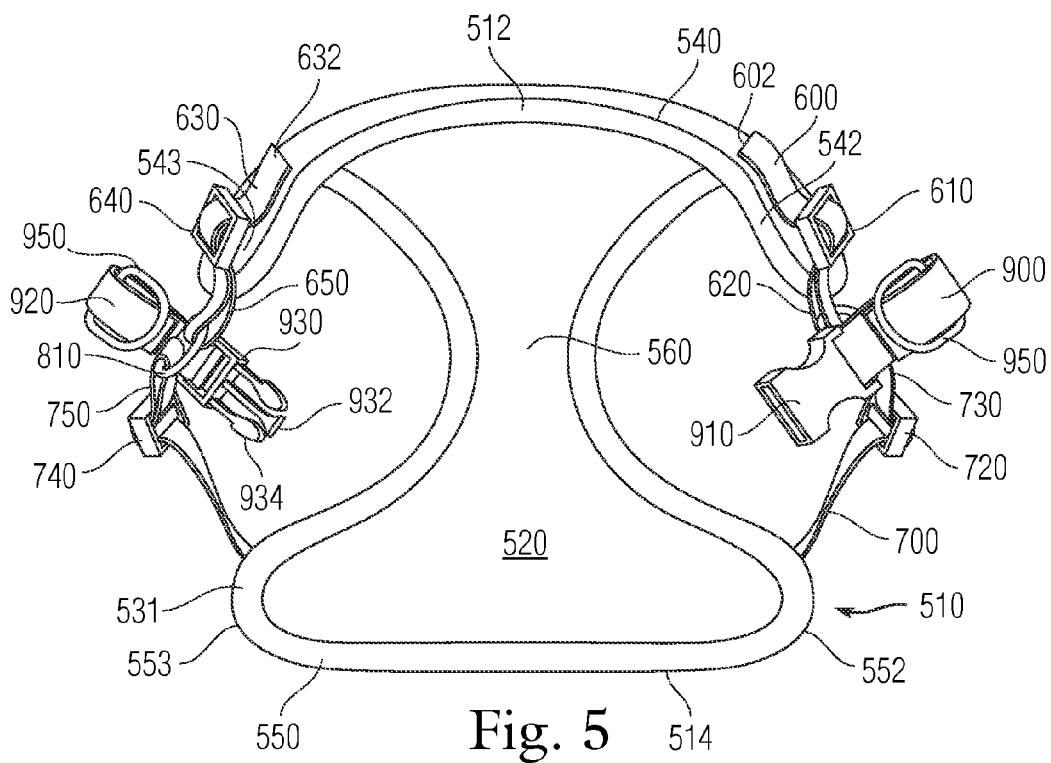
FIG. 5 is bottom perspective view of the dog harness of FIG. 4.
Figure 6:
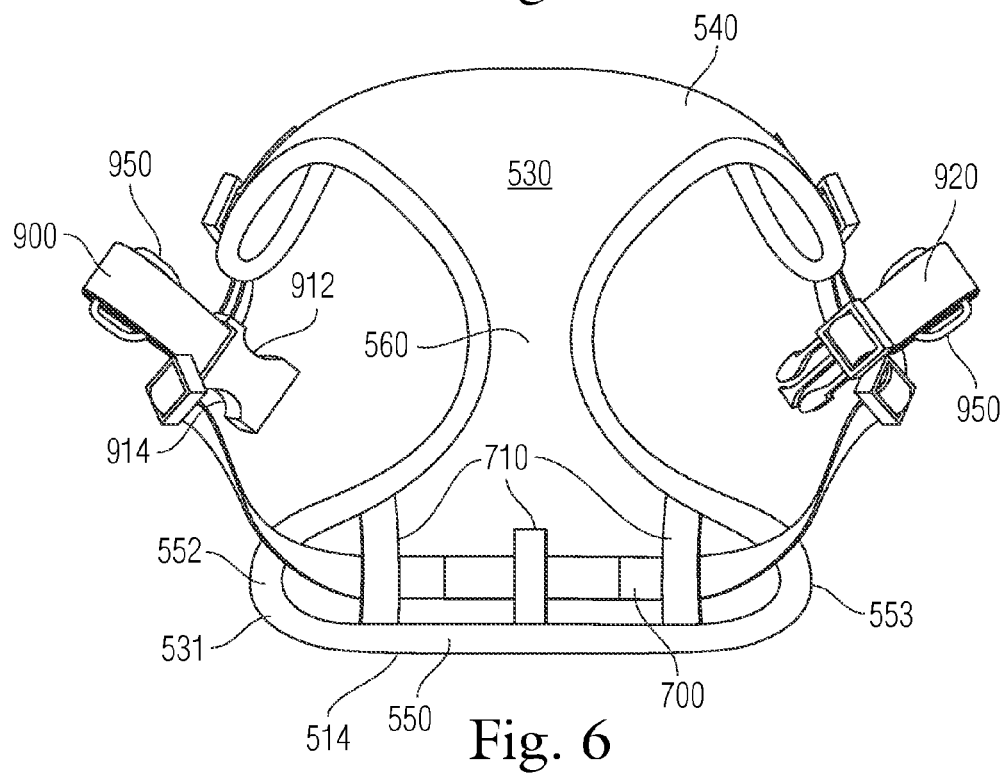
FIG. 6 is a top perspective view of the dog harness of FIG. 4.

Now referring to FIGS. 4-6, a dog harness 500 according to another embodiment is shown. The dog harness 500 is of the type that is known as a leash-controllable harness in accordance with the present invention. The harness 500 has a main harness body 510 that has a first end 512 for placement near the neck of the dog on a forward side of the front paws and an opposite second end 514 for placement to the rear of the front paws of the dog against the dog's belly. The main harness body 510 has a first face or surface 520 that seats against the dog underbelly when worn and an opposite second face or surface 530 that faces away from the dog and faces the ground during use. Since the first face 520 contacts the dog during use, it is formed out of a material that provides comfort. In particular, the first face 520 can be padded or is made from soft material. For example, the harness body 510 can be formed of a synthetic fabric, such as polyester. Along the perimeter edges of the body 510 a folded fabric seam 531 can be formed and has a different texture and feel than the center portion of the body 510. The entire harness body 510 is formed of a fabric material and therefore it is freely foldable and positionable about the dog.

As shown in the figures, the main body 510 generally has an hour glass or I shape that is defines by a first portion 540 that includes the first end 512 and a second portion 550 that includes the second end 514 and a third portion 560 that is located between the first and second portions 540, 550 and represents the middle portion. The first and second portions 540, 550 thus taper down into the third portion 560.

The first portion 540 is defined by a pair of opposing first flaps or wings 542, 543 and similarly, the second portion 550 includes a pair of opposing second flaps or wings 552, 553. It will be appreciated that the length of the first flaps 542 are greater than a length of the second flaps 552 since the first flaps 542 wrap around the shoulder portion of the dog which is typically larger in size than the loin or hindquarters of the dog where the second flaps 552 wrap. The third portion 550 is thus seated against the underside belly or chest of the dog.

At the first flap 542 of the first portion 540, a strap 600 is attached. In particular, the strap 600 has a first end 602 that is attached to the first flap 542 as by being stitched thereto. The second end of the strap 600 is looped over and inserted into a slot or opening of a plastic slider 610 so as to create a loop 620. Similarly, at the first flap 543 of the first portion 540, a strap 630 is attached. In particular, the strap 630 has a first end 632 that is attached to the first flap 543 as by being stitched thereto. The second end of the strap 630 is looped over and inserted into a slot or opening of a plastic slider 640 so as to create a loop 650. The lengths of the straps 600, 630 are approximately the same or are the same.

A strap 700 is coupled to both the second flaps 552, 553 and extends across the second face of the flaps 552, 553. For example, a series of small coupling straps 710 can be attached (stitched) to the second face of the second portion 550. Each coupling strap 710 is attached at its ends to the second face, thereby creating an opening underneath the strap through which the strap 700 can be fed. The strap 700 includes a first end that is looped about a plastic slider 720 to form a loop 730 and a second end that is looped about a plastic slider 740 to form a loop 750. The strap 700 is freely adjustable underneath the straps 710 so that it can be moved laterally across the body of the harness.

In accordance with this embodiment, first and second strap coupling members 800, 810 are provided, one on each side of the harness. The coupling members 800, 810 are in the form of plastic triangular parts that have a central opening 812 (triangular shaped) through which straps are disposed. In particular, the loop 730 at the first end of the strap 700 is disposed within the opening 812 of the coupling member 800 along one inner wall of the triangle and the loop 620 of the strap 600 is disposed within the same opening 812 along another inner wall. Similarly, the loop 750 at the second end of the strap 700 is disposed within the opening 812 of the coupling member 810 along one inner wall of the triangle and the loop 650 of the strap 630 is disposed within the same opening 812 along another inner wall.

A small strap 900 that forms a closed loop is disposed within the opening 812 of the coupling member 800 along the last unoccupied inner wall of the triangular shaped member 800. The small strap 900 captures a female socket 910 that is part of a plastic side release buckle. The female socket 910 is movable within the open portion of the loop. On the coupling member 810, a small strap 920 is provided and it forms a closed loop. The small strap 920 captures and retains a male plug 930, with the male plug 930 being movable within the open portion of the loop. The strap 920 is disposed within the opening 812 of the coupling member 810 along the unoccupied inner wall of the triangular shaped member 810. The male plug 930 is provided with a center tine 932 and a pair of flexible tines 934 on either side of the center tine 932. Female socket 910 is which received the male plug 930 is provided with side notches 912, 914 which expose catch projections on the tines 934 when the male plug is inserted into the female socket 910. To release the buckle, one has only to squeeze in flexible tines 934 so that the male plug 930 can then be withdrawn from the female socket 910.

By having straps 600, 700 be attached to a single coupling member 800, an opening is formed between the peripheral border of the harness along this side and the straps 600, 700 and it is through this opening that the front paw extends. Similarly, by having straps 630, 700 be attached to a single coupling member 810, an opening is formed between the peripheral border of the harness along the side and the straps 630, 700 and it is through this opening the other front paw extends. To secure the harness to the dog, the male plug 930 is brought into locking engagement with the female socket 910 at a location above the back of the dog. This locking engagement results in the padded, comfortable body being in contact with the belly and sides of the dog.

Each of the small straps 900, 920 also includes a metal ring 950 that is used to attach a leash to the harness.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A dog harness comprising:
a harness body that has a first end and an opposing second end, the first end having a pair of first flaps,
a first looped strap securely attached to one of the first flaps;
a second looped strap securely attached to the other of the first flaps;
a rear strap that is coupled to the second end of the harness body in such a manner that the rear strap is slidable in a lateral direction, the rear strap having a first end and an opposing second end;
a first coupling member having an opening formed therein, wherein the first looped strap and the first end of the rear strap are attached to first coupling member by being passed through the opening;
a second coupling member having an opening formed therein, wherein the second looped strap and the second end of the rear strap are attached to the second coupling member by being passed through the opening;
a third looped strap securely attached to the first coupling member by being passed through the opening thereof, the third strap including a first part of a side release buckle;
a fourth looped strap securely attached to the second coupling member by being passed through the opening thereof, the fourth strap including a second part of the side release buckle that interlockingly engages the first part; and
a first ring captured by the third looped strap and a second ring captured by the fourth looped strap, each of the third and fourth straps for attachment to a leash;
wherein the third looped strap has two discrete openings separate from one another, the first coupling member and the first part being received within one opening, while the first ring is received in the other opening, the fourth looped strap having two discrete openings separate from one another, the second coupling member and the second part being received within one opening, while the second ring is received in the other opening.

2. The dog harness of claim 1, wherein the second end includes a pair of second flaps and the rear strap passes through an opening formed underneath a plurality of spaced straps that are attached along the second end including the second flaps, the rear strap being permitted to be adjusted underneath the spaced straps and moved laterally.

3. The dog harness of claim 1, wherein the harness body is formed of a synthetic fabric and has an I- shape.

4. The dog harness of claim 1, wherein each of the first and second coupling members is in the form of a plastic triangular shaped part.

5. The dog harness of claim 1, wherein each of the first and second ends of the rear strap includes a loop that passes through the openings formed in the first and second coupling members, respectively.

6. The dog harness of claim 1, wherein the first part of the side release buckle comprises a female socket and the second part of the side release buckle comprises a complementary male plug.

7. A dog harness comprising:
a harness body that has a first end and an opposing second end, the first end having a pair of first flaps for placement in front of the front legs of the dog and the second end having a pair of second flaps for placement along a torso of the dog between the front legs and rear legs, wherein a width of the harness body is at a minimum in a middle section between the first flaps and the second flaps;
a front strap assembly coupled to and extending between the first flaps located at the first end, wherein the front strap assembly comprises a first strap section that is fixedly attached at both ends thereof to one first flap so as to form a looped structure that passes through a first slot that is defined in a first connector, the first connector including a second slot separated from the first slot, wherein the front strap assembly includes a second strap section having a first end fixedly attached to the other first flap and an opposite free end, the second strap section passing through the second slot of the first connector so as to define a looped structure that also passes through a slider that allows a length of the second strap section to be adjusted to allow the front strap assembly to be securely fitted to the dog's torso, while the first flaps are joined together by the second strap section, the opposite free end being disposed over the other first flap;

a leash strap having a first section that receives the front strap and a second separate section that receives a ring for attaching to a leash, wherein the leash strap can move laterally along at least a length of the front strap to accommodate dog movement relative to the leash; and a rear strap having a first part attached to one second flap and a second part attached to the other second flap, the first part including a first connector that intimately mates with a second connector that is associated with the second part to allow attachment between the first and second parts about the torso of the dog, wherein a length of the first part is adjustable.

8. The dog harness of claim 7, wherein the first section of the leash strap comprises a looped section that has a center opening that receives the looped structure of the second strap section.

9. The dog harness of claim 7, wherein the first slot faces the one first flap and the second slot faces the other first flap.

10. The dog harness of claim 7, wherein the second strap section extends from the one first flap to the other first flap.

\* \* \* \* \*